Oct. 24, 1967   P. EDICK   3,348,815
CLAY MIXER AND EXTRUDER
Filed Dec. 27, 1966
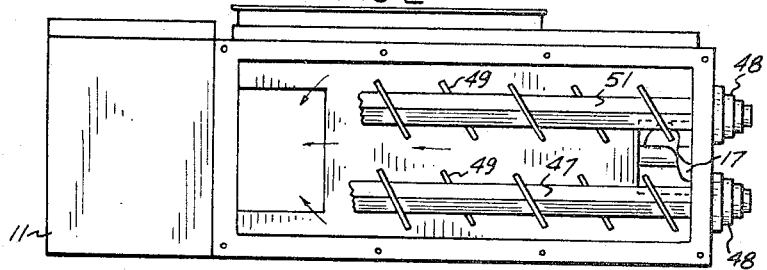
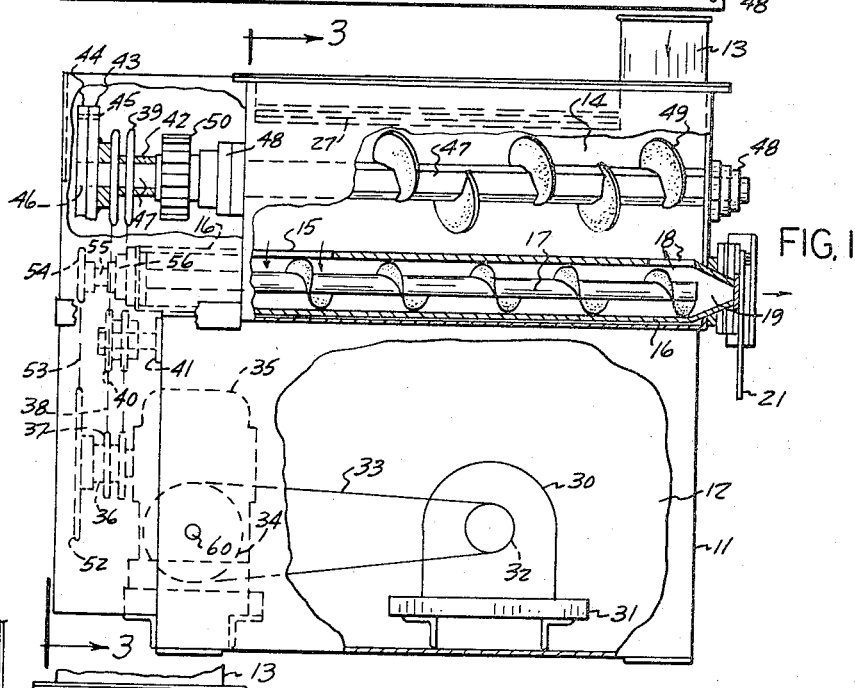
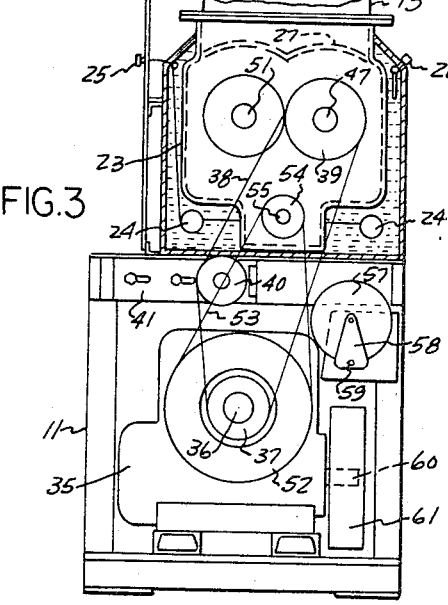
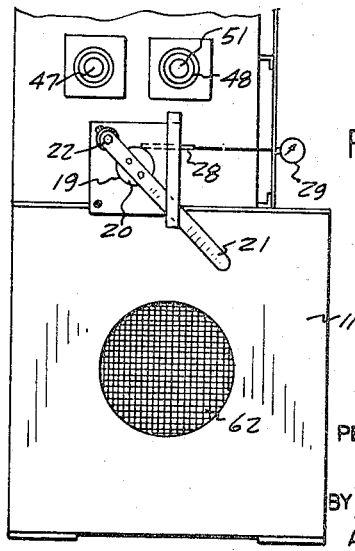
INVENTOR
PERCY EDICK
BY Cullen, Sloman, & Cantor
ATTORNEYS United States Patent Office 3,348,815
Patented Oct. 24, 1967

3,348,815
CLAY MIXER AND EXTRUDER
Percy Edick, 425 S. Campbell, Detroit, Mich. 48209
Filed Dec. 27, 1966, Ser. No. 604,673
6 Claims. (Cl. 259—6)

ABSTRACT OF THE DISCLOSURE

The present disclosure is directed to a clay extruder which includes a power train chamber and a clay handling chamber, the latter including means for mixing the clay, advancing the clay within the chamber and delivering the same to a feed screw within an extruder tube having an outlet terminating outwardly of the machine housing over which is provided a pivotally mounted normally closed cut off and closure gate and wherein the recirculation outlet is provided between the outlet end of the extruder tube and the mixing chamber through which the mixed clay continues to pass when the extruder gate is closed.

---

The present invention relates to a clay extruder device, and more particularly to a machine for heating clay, mixing clay and for extruding clay.

Disclosure

It is an object of the present invention to provide an improved combination clay extruder which incorporates in one machine which is automatically operable, means for injecting clay into a mixing chamber for breaking up the clay and for feeding and maintaining the clay at a predetermined minimum and maximum temperature and delivering the clay to an extruding tube and wherein power means are provided in the form of a feed screw for advancing the clay through the extruder tube and through a gate controlled outlet.

It is another object of the present invention to provide a means by which the clay will continuously circulate between the extruder tube and the mixing chamber during those periods when the extruder cutoff and closure gate is in a closed position to thus keep the clay by its continued movement at the predetermined desired minimum and maximum temperature and to prevent caking thereof.

It is another object to provide a novel form of heating means by which the mixing chamber and the extruding tube are maintained at a predetermined desired temperature for the clay, which temperature is maintained uniformly throughout the extruder housing.

It is another object of the present invention to provide a novel form of power train for transmitting power to the clay mixing and feeding means within the mixing chamber and simultaneously providing power driving the extruder feed screw and incorporating a safety means for disconnecting the power from the mixing and clay advancing means if too great a resistance to rotation thereof occurs, such as might damage the mechanism.

These and other objects will be seen from the following specification and claims in conjunction with the appended drawings in which FIG. 1 is a fragmentarily partially broken away side elevational view of the present clay extruder with a portion of the corresponding housing wall removed for clarity of illustration.

FIG. 2 is a similar fragmentary plan view thereof with portions of the cover removed for clarity of illustration.

FIG. 3 is a partly fragmentary and partly sectioned and elevational view taken in the direction of arrow 3—3 of FIG. 1.

FIG. 4 is a fragmentary elevational view partly broken away and taken from the opposite end of FIG. 1.

It will be understood that the above drawing illustrates merely a preferred embodiment of the invention and that other embodiments are contemplated within the scope of the claims hereafter set forth.

Referring to the drawing, the present clay extruder device or machine includes the housing 11 of sheet metal or other suitable material which includes power train chamber 12, clay charging inlet 13, mixing chamber 14, tube inlet 15 communicating with extruder tube 16 longitudinally disposed within the housing underlying said mixing chamber.

A power operated feed screw 17 is rotatively nested within the extruder tube 16 and at its end opposite the inlet 15 has a recirculation outlet or passage 18 provided which interconnects the outlet end of the extruder tube with one end of mixing chamber to provide for recirculation of the mixed and preheated clay during those periods when the extruder outlet 19, FIG. 4 is closed by the cutoff gate 20.

A suitable handle 21 is connected to the cutoff gate 20 which is normally closed, said handle being pivotally mounted as at 22.

As viewed particularly in the cutaway view, FIG. 3, a suitable double walled water jacket 23 is provided which substantially encloses the mixing chamber and the extruder tube 16 for circulating water therein and including water heaters 24 the detail of which is not described herein. In the illustrative embodiment however, these water heaters may be electrical heaters which have suitable temperature controls 25 and temperature indicators 26 which include a suitable gauge for visibly reading the temperature of the water within the water jacket.

Positioned within the housing above and overlying the mixing chamber are the elongated cove-shaped shrouds 27.

Also as shown in FIG. 4, a temperature responsive bulb is mounted upon the extruder outlet as at 28 and includes a temperature gauge 29 and control for accurately indicating the temperature of the clay as it is extruded from the extruder machine, and for stopping the power train if the temperature rise exceeds a predetermined setting.

Within the power train chamber 12 as shown in FIG. 1, there is provided motor 30, which may be an electric motor, anchored and mounted within said housing upon base 31 and including the drive sheave 32, which through a suitable V-belt 33 activates the driven sheave 34 upon input shaft 60 of speed reducer 35.

Output shaft 36 mounts double sprocket 37 which through corresponding roller chains 38 drives the sprockets 39 secured upon the sleeve 42, in turn loosely journaled upon one of the shafts 47.

Idler sprocket 40 is journaled upon the adjustable plate 41, FIG. 3 for regulating the tension within the sprocket chains or roller chains 38, as best shown in FIG. 1.

As best shown in FIG. 1, the drive plate or drive wheel 43 is secured to sleeve 42, all being loosely journaled upon the elongated shaft 47 which extends through the mixing chamber and is journaled through suitable bearings 48.

Driven plate or wheel 44 bears against drive wheel 43 and is fixedly keyed as at 46 to the shaft 47, there being a suitable shear pin 45 interconnecting the said plates 43 and 44 so that said plates rotate in unison and provide a means for transmitting power to the first shaft 47 which extends through the mixing chamber.

Mounted upon the elongated shaft or paddle shaft 47 are a series of longitudinally spaced angularly disposed paddle wheels or discs 49 which extend substantially the full length of the mixing chamber.

The second shaft 51 is parallel to first shaft 47 and is also journaled through the mixing chamber and mounted upon corresponding similar bearings 48 and is interconnected with first shaft 47 by the spur gears generally indicated at 50 for rotation in unison. A similar set of angularly disposed paddle wheels or discs 49 are mounted and secured upon the second shaft 51 and are so angularly disposed that rotation of the respective sets of discs 49 or paddles will tend to advance the clay as it is projected into the mixing chamber from the right end thereof, FIG. 1, towards the left end thereof by which the clay so mixed and preheated is directed through the passageway 15 down into one end of the extruder tube 16, FIG. 1.

Referring again to FIG. 1, sprocket gear 52 also upon output shaft 36 of the speed reducer is connected by roller chain 53. Sprocket 52 through sprocket chain 53 drives the sprocket 54 which is secured upon shaft 55 which extends into the extruder tube 16 and forms a part of the extruder screw 17 and is journaled at its one end as by the bearings 56.

As best shown in FIG. 3, the take-up sprocket 57 is journaled upon the chain tightener 58 which is pivotally mounted at 59 upon the housing.

The input shaft for the speed reducer, FIG. 1, as best shown in FIG. 3 has also mounted thereon a fan 61 which in cooperation with the vent grille 62, FIG. 4, provides a means for circulating cooling air through the power train chamber 12.

In the illustrative embodiment of the invention and incorporating the present mechanism and process, the clay as it is being mixed and extruded is maintained preferably at or approximately 120° F.

Having described my invention, reference should now be had to the following claims.

I claim:
1. A machine for heating, mixing and extruding clay comprising a housing, having a power train chamber and a clay mixing chamber; a clay charging inlet upon said housing adjacent one end of the mixing chamber; a pair of spaced power driven shafts journaled through said mixing chamber; a series of longitudinally spaced angularly disposed paddles on each shaft for breaking up and mixing the clay and for advancing the clay to the other end of said mixing chamber; an extruding tube in said housing underlying and parallel to said mixing chamber and extending outwardly of said housing and including an extruding outlet; a manually movable clay cutoff gate normally closing said tube outlet; an inlet passage between said other end of said mixing chamber and said one end of said tube; and a power driven clay feed screw rotatively mounted within said tube.

2. In the clay mixing machine of claim 1, and a clay recirculation outlet interconnecting the other end of said tube and said one end of said mixing chamber, providing continuous mixing and movement of the clay when said gate is closed.

3. In the clay extruder of claim 1, and means supplying heat to said mixing chamber and extruder tube for maintaining the mixed clay at a predetermined temperature.

4. In the clay extruding machine of claim 3, said heat supply means including a water jacket substantially surrounding said mixing chamber and extruding tube, and heating means for the water in said jacket.

5. In the clay extruder of claim 4, a temperature detector bulb in said water jacket including a temperature gauge; and a remote temperature control connected to said heater means.

6. In the clay extruder of claim 1, a power train including a motor and a speed reducer for driving said shafts and said feed screw; said train including a rotative drive wheel journaled loosely on one of said shafts; a driven wheel engaging said drive wheel and secured to said one shaft; a shear pin interconnecting said wheels; and gear means interconnecting said shafts for rotation in unison.

References Cited

UNITED STATES PATENTS

| 1,750,645 | 3/1930 | Offenhauser | 259—104 |
| 2,177,910 | 10/1939 | Smit | 259—6 |
| 2,947,524 | 8/1960 | Bridges | 259—6 |
| 3,090,605 | 5/1963 | Copeland et al. | 259—104 |
| 3,203,370 | 8/1965 | Haug et al. | 259—6 X |

ROBERT W. JENKINS, *Primary Examiner.*